(12) United States Patent
Gasal et al.

(10) Patent No.: US 6,547,061 B2
(45) Date of Patent: Apr. 15, 2003

(54) CARGO HANDLING SYSTEM

(75) Inventors: Steve C Gasal, Jamestown, ND (US); Ronald D Robson, Fargo, ND (US); Aaron J Roberts, Jamestown, ND (US)

(73) Assignee: Lucas Western, Inc., Jamestown, ND (US)

( * ) Notice: Subject to any disclaimer, the term of this patent is extended or adjusted under 35 U.S.C. 154(b) by 0 days.

(21) Appl. No.: 09/769,946

(22) Filed: Jan. 25, 2001

(65) Prior Publication Data

US 2001/0023910 A1 Sep. 27, 2001

(30) Foreign Application Priority Data

Jan. 25, 2000 (GB) ................................ 0001504

(51) Int. Cl.[7] .............................................. B65G 25/10
(52) U.S. Cl. ...................................... 198/746; 198/747
(58) Field of Search ................................. 198/738, 746, 198/747, 748

(56) References Cited

U.S. PATENT DOCUMENTS

| | | | | |
|---|---|---|---|---|
| 3,568,825 A | * | 3/1971 | Munger | ...................... 198/746 |
| 3,931,883 A | * | 1/1976 | Williard et al. | ......... 198/746 X |
| 3,986,605 A | * | 10/1976 | Dooley et al. | ............... 198/746 |
| 4,154,334 A | * | 5/1979 | Ivanov et al. | ................ 198/746 |
| 4,170,292 A | * | 10/1979 | Lang | ........................... 198/746 |
| 4,175,656 A | | 11/1979 | Lang | ........................... 198/748 |
| 5,695,044 A | * | 12/1997 | Morikiyo et al. | ............ 198/746 |

FOREIGN PATENT DOCUMENTS

| DE | 35 04 869 A | 8/1986 |
|---|---|---|
| FR | 2 431 445 | 2/1980 |

\* cited by examiner

*Primary Examiner*—James R. Bidwell
(74) *Attorney, Agent, or Firm*—Andrus, Sceales, Starke & Sawall

(57) ABSTRACT

A cargo system for an aircraft includes an elongate endless drive arrangement extending along the path of travel of a load unit, the endless drive arrangement including a carriage movable along the path and a load unit engaging member on the carriage and movable relative thereto between a load unit engagement position and an inoperative position in response to relative movement between first and second elements of the endless drive arrangement.

7 Claims, 5 Drawing Sheets

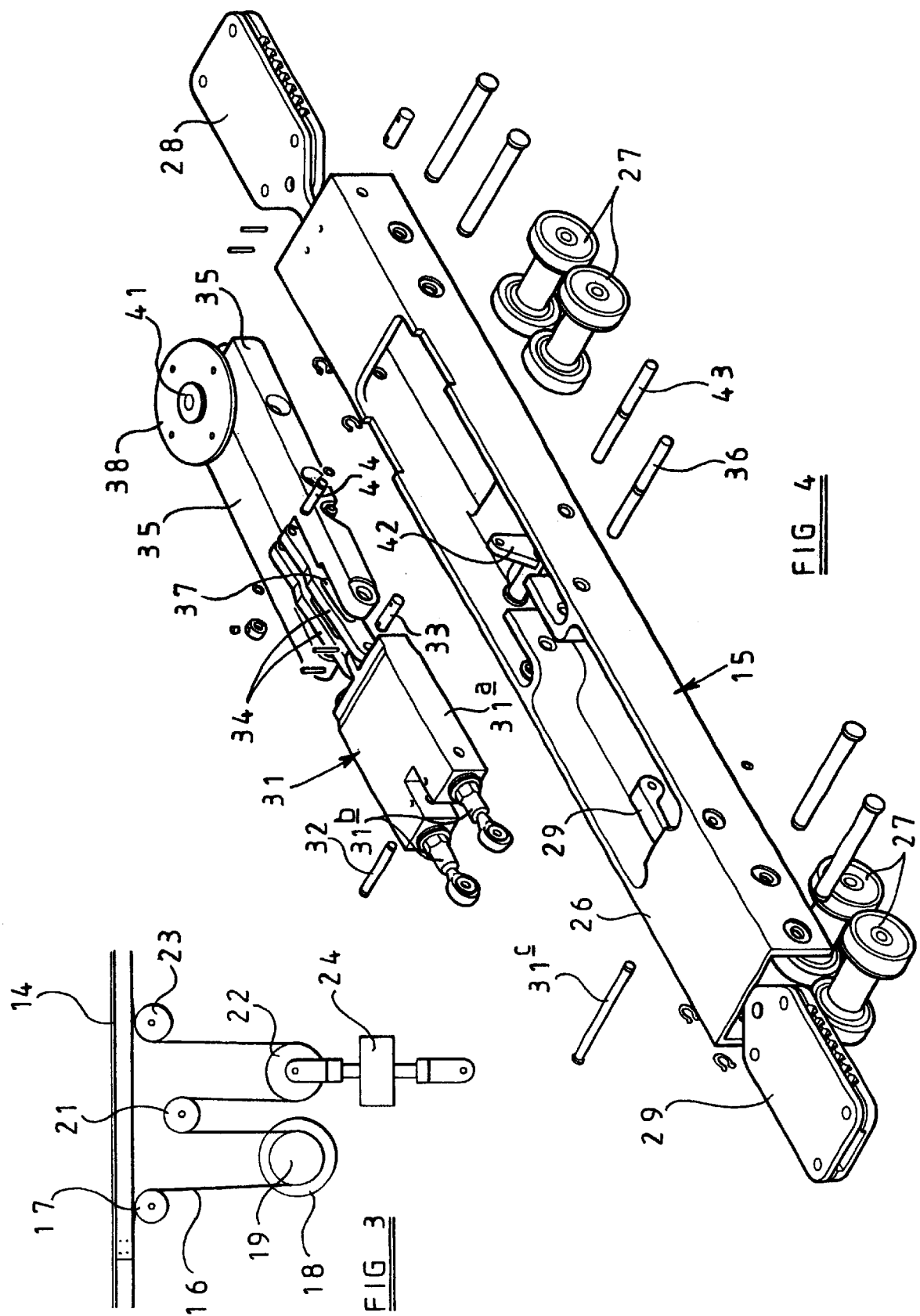

CARGO HANDLING SYSTEM

Figure 1:
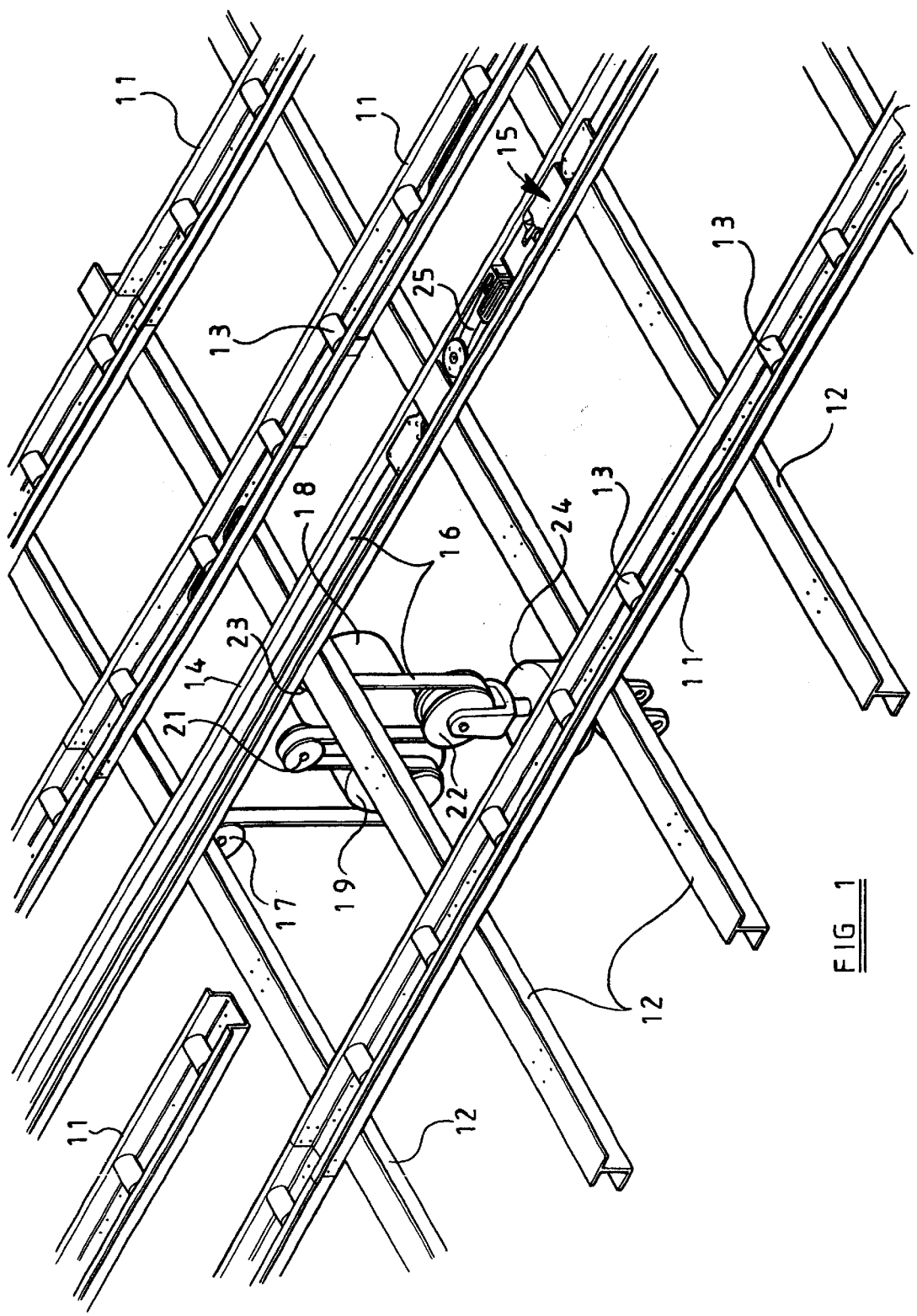

This invention relates to a cargo handling system primarily, but not exclusively, intended for use in handling load units in the cargo compartment of an aircraft.

Conventionally a cargo compartment of an aircraft is provided with a plurality of roller tracks which provide a low friction support along which load units in the form of cargo containers or pallets can be transported along the length of the cargo compartment. It is known to drive the load units from an endless drive member in the form of a belt or chain extending parallel to the roller tracks. A carriage secured to the endless drive member is provided with an abutment element which engages a load unit during movement of the endless drive member and pushes the load unit along the roller track.

U.S. Pat. No. 4,154,334 discloses such an arrangement, and discloses also that the abutment member may be pivotally mounted on the carriage, and spring urged to a position in which it can abut a load unit. Stop means on the abutment member and the carriage limit pivoting movement of the abutment member relative to the carriage in one direction so that for movement in an appropriate direction the abutment cannot pivot further relative to the carriage and thus forms a fixed abutment engaging the load unit and transmitting drive thereto. However, as the carriage moves in the opposite direction the abutment can be pivoted against the spring bias, relative to the carriage, by engagement with a load unit, so that it passes beneath the load unit and does not transmit drive to the load unit. The abutment member and its associated stop means is reversible in position relative to the carriage, by manual adjustment, to reverse the direction of movement of the carriage in which the abutment transmits drive to a load unit. It will be recognised therefore that in the arrangement disclosed in U.S. Pat. No. 4,154,334 the abutment member normally occupies a position in which it will abut a load unit, and manual intervention is required in order to reverse the direction of travel of the carriage in which the abutment is effective to transmit drive to a load unit. It is an object of the present invention to provide a cargo handling system which avoids the difficulties of manual intervention in a simple and convenient manner.

In accordance with the present invention there is provided a cargo handling system comprising an elongate endless drive arrangement extending along the intended path of travel of a load unit in use, the endless drive arrangement including a carriage movable along said path and a load unit engaging member on the carriage and movable relative thereto between a load unit engagement position and an inoperative position in response to relative movement between first and second elements of the endless drive arrangement.

Preferably said endless drive arrangement includes an elongate drive belt or chain the opposite ends of which are coupled to said carriage so that the belt or chain and the carriage define a loop, said first and second elements of the drive arrangement being the opposite ends of said drive belt or chain respectively.

Conveniently the coupling of at least one of the ends of said belt or chain to the carriage permits movement of said end relative to the carriage to provide said relative movement between the first and second elements of the arrangement to actuate said load unit engaging member.

Conveniently the opposite ends of said drive belt or chain are moved relative to one another by increasing and decreasing the tension in the drive belt or chain.

Preferably the tension in the drive belt or chain is varied by an adjustable pulley arrangement co-operating with the drive chain or belt.

Alternatively said drive arrangement comprises first and second drive chains or belts coupled to said carriage, said first and second chains or belts defining the first and second elements of the drive arrangement respectively, and being movable relative to one another to actuate said load engaging member.

Figure 2:
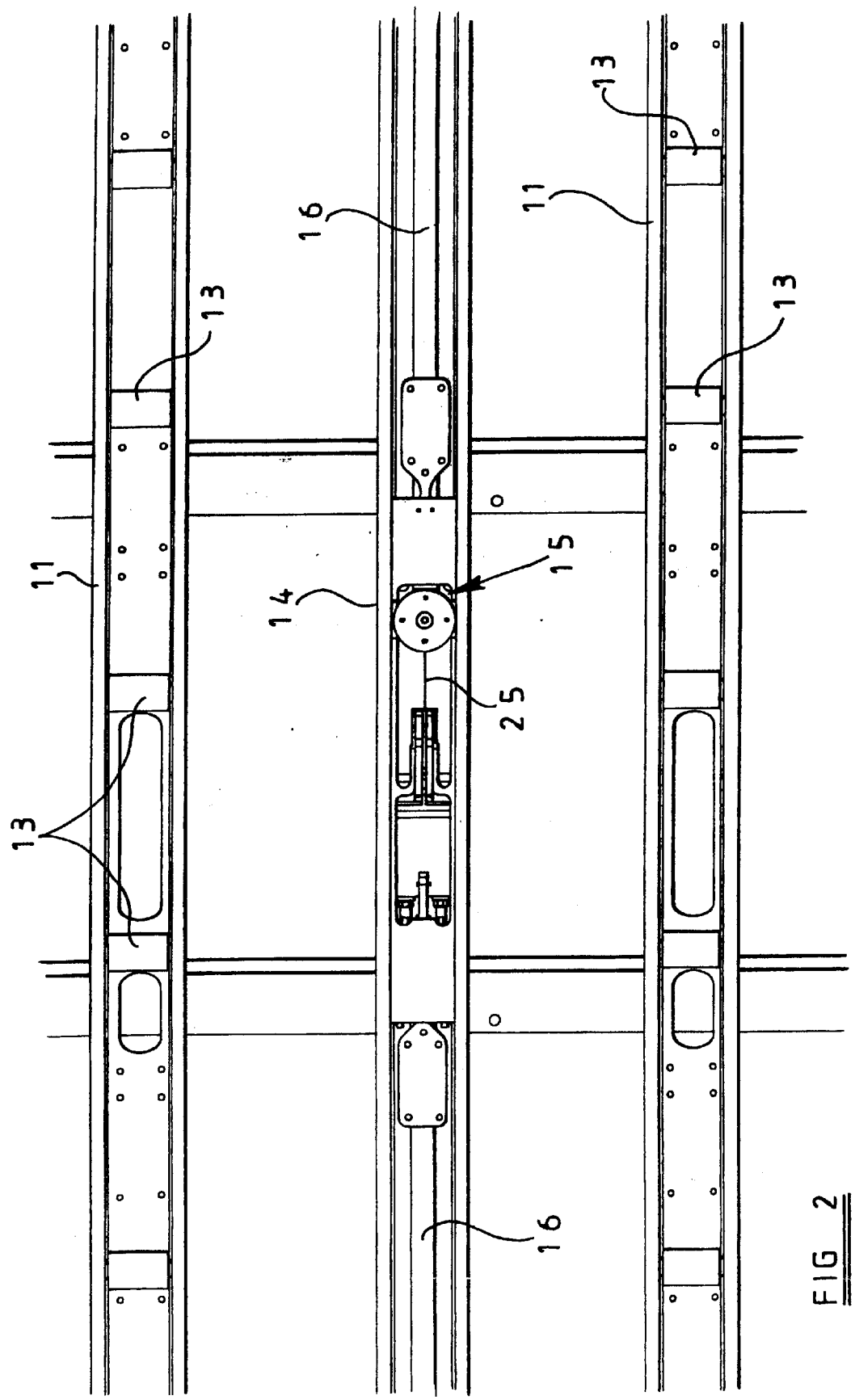
Figure 5:
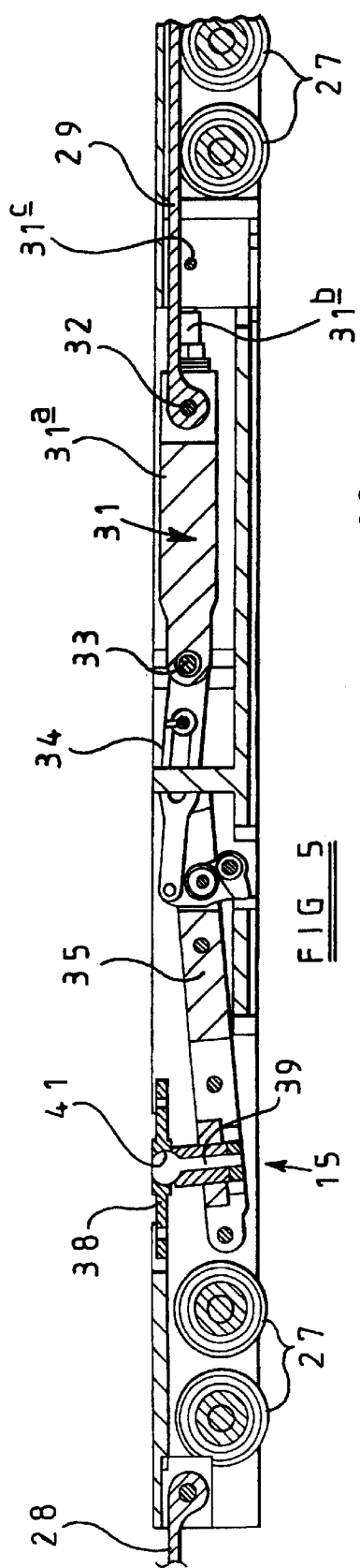
Figure 7:
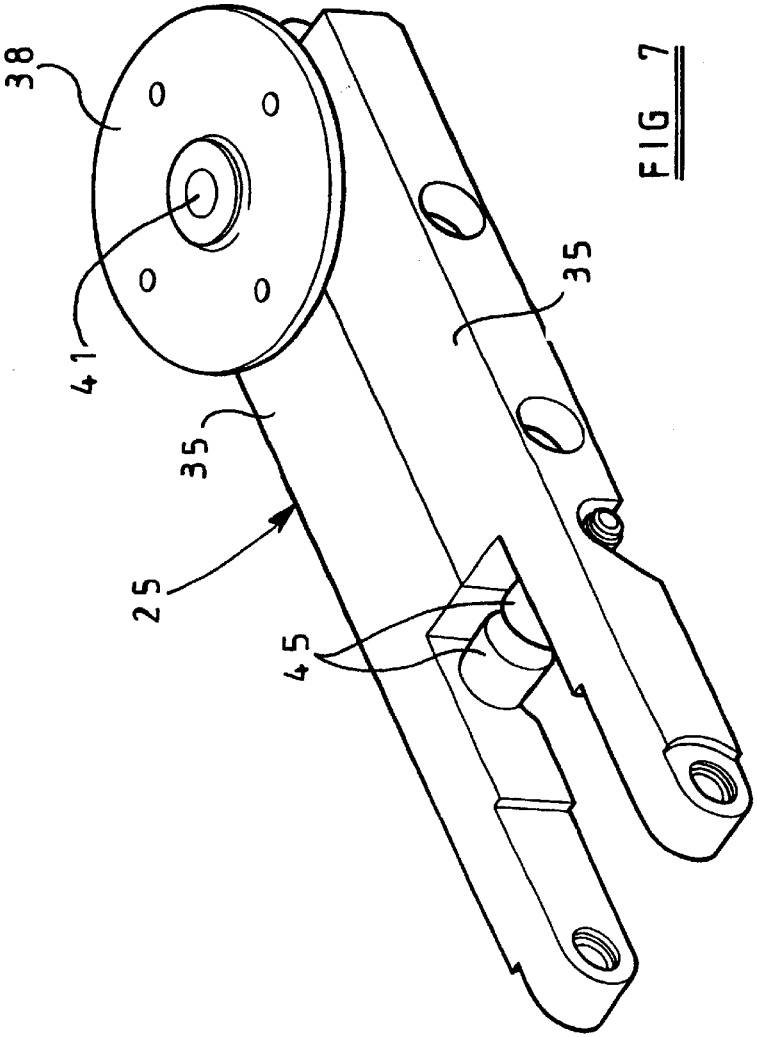
Figure 6:
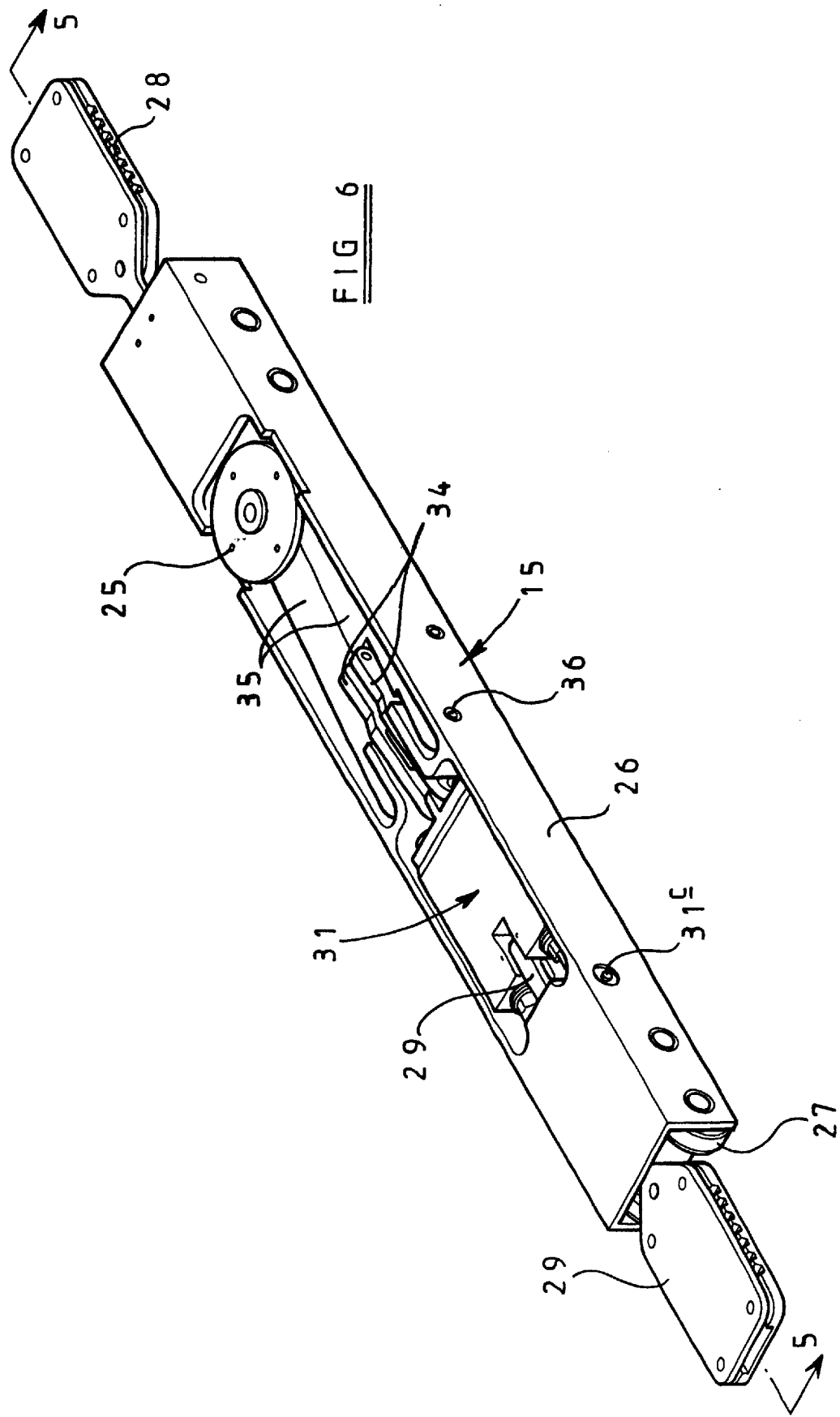

One example of the present invention is illustrated in the accompanying drawings wherein:

FIG. 1 is a diagrammatic perspective view of part of a cargo handling system of the cargo compartment of an aircraft, FIG. 2 is a plan view of part of the system illustrated in FIG. 1, FIG. 3 is a diagrammatic elevational view of part of the drive and tensioning arrangement of the system, FIG. 4 is a diagrammatic, exploded perspective view of the carriage of the system of FIG. 1, FIG. 5 is a longitudinal sectional view of the carriage, FIG. 6 is a diagrammatic perspective view of the assembled carriage, and FIG. 7 is a diagrammatic perspective view of a load unit engaging member of the carriage.

The cargo handling system includes a plurality of elongate, generally parallel, roller trays 11 which extend longitudinally of the cargo compartment of the aircraft. In the example illustrated in FIG. 1 the elongate roller trays 11 span transverse floor beams 12 of the cargo compartment, although it will be recognised that the way in which the roller trays are supported will depend upon the construction of the aircraft cargo compartment. The roller trays 11 are of known form, and comprise elongate metal channels housing a plurality of rollers 13 which, in known manner, provide a low friction transport path for load units which may be in the form of containers, or pallets for carrying cargo. The manner in which the load units are introduced through a doorway of the aircraft and are transported laterally to align with the roller trays 11 is conventional, and forms no part of the present invention.

In order to drive a load unit along the length of its supporting roller trays 11 there is provided a drive arrangement which includes a metal guide channel 14 extending parallel to the roller trays 11 and lying between a pair of roller trays 11 which are bridged by a load unit to be transported. The guide channel 14 extends through at least the full length of the path of travel of a load unit and has, at its opposite ends respectively, first and second rollers disposed horizontally with their axes of rotation transverse to the length of the channel. A carriage 15 is received in the channel 14 for movement along the length of the channel and an elongate toothed drive belt 16 has its opposite ends coupled to opposite ends respectively of the carriage 15 and extends around the rollers at the ends of the channel 14 so that the belt 16 and carriage 15 define an elongate endless loop.

It will be recognised that the belt 16 defines upper and lower runs within the channel 14, and at a convenient point along the length of the channel 14 the lower run of the belt passes downwardly over a roller 17 positioned immediately beneath the channel 14, and then around the drive pulley 19 of an electric drive motor 18. Thereafter the lower run of the belt 16 passes over an idler pulley 21 and around an adjustable tensioning pulley 22 for passing over a further roller 23 immediately beneath the channel 14.

Operation of the motor 18 drives the belt, and thus moves the carriage 15 forward or backward along the length of the guide channel 14. The pulley 22 is coupled to a pneumatic or hydraulic actuator 24 operation of which adjusts the position of the pulley 22 vertically towards and away from the channel 14 thus altering the tension in the belt 16. As will be described in more detail hereinafter increasing the tension in the belt 16 actuates a load unit engaging element 25 of the carriage 15.

The carriage 15 comprises an elongate, metal, box like housing 26 dimensioned to fit within the guide channel 14 for longitudinal movement therein, and in the form of a channel having its open face presented downwardly towards the base of the guide channel 14. At its opposite ends respectively the housing 26 supports pairs of rollers 27 which protrude from the lower face of the carriage and engage the base of the guide channel 14 to support the carriage for rolling movement in the channel.

When considering FIGS. 4, 5 and 6 it should be recognised that FIG. 5 is a sectional view on the line 5—5 in FIG. 6 and thus shows the components reversed along the length of the housing 26 by comparison with FIGS. 4 and 6.

Protruding from the left hand end of the housing 26 as seen in FIG. 5, (and thus protruding from the right hand end as seen in FIGS. 4 and 6) is a first belt attachment member 28. The belt attachment member 28 is anchored to the housing 26, and is defined by a pair of clamping plates secured together by screws, one of the plates having transverse grooves for receiving the transverse lugs of the toothed timing belt 16.

A second belt attachment member 29 of similar form protrudes from the opposite end of the housing 26 for attachment to the other end of the belt 16. However, the member 29 is not rigidly attached to the housing 26, and instead is secured to one end of a movable component 31a of a spring pack 31 received within the housing 26. The member 29 is secured to the component 31a by a transversely extending pivot pin 32, a parallel pivot pin 33 securing the opposite end of the component 31a to a pair of elongate link members 34.

The spring pack 31 includes a fixed component 31b relative to which the component 31a slides in use. The fixed component 31b includes a pair of parallel eye-bolts anchored to the housing 26 by means of a pin 31c parallel to the pin 32, and a pair of compression springs within the component 31a act between the fixed and movable components to urge the member 29 and component 31a to the left in FIG. 4. The springs have a manually adjustable pre-load and are compressed by outward longitudinal movement of the member 29 relative to the housing 26.

The load engagement member 25 includes a pair of interconnected, elongate arms 35 pivotally mounted at one end to the housing by a transverse pivot pin 36. At their ends presented to the pivot pin the arms 35 are of reduced thickness so as to define between them a rectangular gap into which the link members 34 extend. The link members are longitudinally slotted at 37 and the pivot pin 36 passes through the longitudinal slots of the link members 34. At their ends remote from the pivot pin 36 the arms 35 carry an upwardly presented steel disc 38 supported at one end of a steel shank 39. The shank 39 has, at said one end, a ball and socket connection 41 with the disc 38, and, at its other end is in screw threaded engagement with a captive nut anchored between the arms 35. The ball and socket connection 41 allows the plane of the disc 38 to adjust relative to the plane of the arms 35.

The arms 35 can pivot relative to the housing 26 between a collapsed position illustrated in the drawings, and a raised position in which the arms 35 have pivoted, as a unit, about the axis of the pin 36 and the arms 35 protrude upwardly obliquely, from the housing 26.

A pivoting cam member 42 is pivotally mounted in the housing 26 beneath the arms 35 by a transverse pivot pin 43, and is pivotally coupled to the end of the link members 34 remote from the spring pack 31 by a further transverse pivot pin 44. The cam member 42 co-operates with a pair of cam follower rollers 45 carried by the arms 35 of the member 25 whereby moving the belt attachment member 29 to the left (in FIGS. 4 and 6) relative to the housing 26 pulls the link members 34 to the left through the intermediary of the component 31a of the spring pack 31, thus pivoting the cam 42 relative to the housing 26 and displacing the load engagement member 25 upwardly about its pivot axis 36 by co-action between the cam 42 and the cam follower rollers 45. Movement of the member 29 in the opposite direct permits the member 25 to pivot downwardly to the rest position shown in FIGS. 5 and 6.

The operation of the system is as follows. At the commencement of a cargo handling exercise the load unit to be transported along the length of the cargo bay of the aircraft will have been transported laterally through the cargo bay door and will be positioned on the appropriate roller tracks 11. The drive motor 18 will have been operated to move the belt 16, and thus to move the carriage 15 so that the carriage lies beneath the load unit to be moved. The member 25 of the carriage will be in its rest, lowered position with a friction pad carried by the disc 38 positioned beneath the load unit. The actuator 24 will then be operated to move the pulley 22 downwardly relative to the channel 14 thereby increasing the tension in the belt 16. The belt coupling member 28 cannot move relative to the carriage 15, and thus the member 29 is moved outwardly relative to the housing 26 as a result of the increased tension. This movement of the member 29 is transmitted, as described above, through the spring pack component 31a against the action of the compression springs of the pack 31 to cause the cam 42 to move the member 25 upwardly. The movement of the pulley 22 is such that the member 25 is raised to engage the pad of the disc 38 firmly with the lower surface of the load unit so that sufficient friction exists between the pad and the load unit for the load unit to move with the carriage 15 as the carriage 15 is moved along the channel 14.

Next the motor 18 is operated to drive the carriage 15 along the track 14 so that the load unit is moved to the desired position along the length of the roller tracks 11. Thereafter the actuator 24 is operated to raise the pulley 22, releasing some of the tension in the belt 16, and allowing the load engaging member 25 to collapse back to its rest position disengaging the pad of the disc 38 from the load unit. The ball and socket connection 41 allows the disc 38 to adapt its orientation to make facial contact between its pad and the lower surface of the load unit.

It will be recognised that when it is required to retrieve a load unit and move it back towards the door of the cargo bay then the carriage is driven by the motor 18 to an appropriate position beneath the load unit which is to be retrieved, the actuator 24 is operated to increase the tension in the belt 16 and thus cause the pad of the disc 38 of the unit engaging member to grip the lower surface of the load unit, and the motor 18 is then operated in the opposite direction to move the carriage with the load unit back along the length of the cargo bay.

The belt 16 is, as mentioned above, a toothed timing belt, and thus there is not slip between the belt 16 and the pulley 19 of the motor 18. The motor 18 has some convenient control mechanism, for example including a rotary encoder whereby electronically the position of the carriage along the length of the channel 14 is known to a control system. The control system can thus be operated manually, with reference to an indicator showing the operator the position of the carriage, or can be operated automatically under the control of a computer or the like.

It will be recognised that within the load compartment of an aircraft there may well be a second set of roller tracks 11 adjacent the first mentioned set, the second set of roller tracks having a drive arrangement of the kind described above associated therewith. As the two sets of roller tracks and the two drive systems are positioned parallel to one another it is convenient to mount their drive motors 18 adjacent one another and to provide a controllable interconnection so that in the event of failure of one of the motors 18 the remaining motor 18 can be used sequentially to drive both drive arrangements. If desired a third drive motor may be positioned between the two primary drive motors in such a way that it may drive either the right or the left drive arrangement in the event of a motor failure. Again electronically controllable interconnection means, for example electric clutches, will permit the third motor to be connected to the drive trains of either of the first and second motors.

The pre-load of the springs of the spring pack 31 can be adjusted to control the pre-tension in the belt 16, that is to say the tension which exists when the pulley 22 is in its rest position. Moreover, a force limiting arrangement may be incorporated to ensure that the element 25 cannot apply so much upward force to the load unit that the load unit is lifted from its roller trays. For example, where the actuator 24 is hydraulic a pressure relief valve may be incorporated to limit the pressure applied to the actuator 24 to a value at which load units of predetermined minimum weight cannot be lifted.

It will be understood that since the position of the carriage 15 along the length of the channel 14 is known at all times, then the control system controlling operation of the motor 18 can cause the motor 18 to operate rapidly during the major part of the transport of the load unit along the length of the bay. The speed of the motor 18 will be reduced as the load unit approaches its desired position. Moreover, the control system which controls operation of the motor 18 and the actuator 24 may be provided with sufficient computer "intelligence" to be able to accommodate signals from transducers measuring torque feedback from the motor, and force feedback from the element 25 to control the amount of force with which the pad of the disc 38 is pressed against the undersurface of the load unit.

In a modification the carriage 15 is rigidly secured to both ends of the belt 16, and the actuator 24, pulley 22 and the pulley 21 are dispensed with. A second, parallel, drive belt sits alongside the drive belt 16, and moves therewith. However, the second drive belt is not secured at its ends to the carriage 15, and its purpose is to control operation of the load unit engaging member 25, and not specifically to transmit drive to the carriage 15. The member 25 is actuated to be raised or lowered relative to the housing 26 by altering the phase relationship between the drive belt 16 and the second drive belt. Thus, for example, moving the second drive belt forwardly relative to the first drive belt will be used through the intermediary of a cam mechanism or the like to lift the member 25 relative to the housing 26 and return movement of the second belt relative to the first belt will allow the member 25 to collapse back into the housing 26.

We claim:

1. A cargo handling system for an aircraft comprising a drive arrangement for engagement with a load unit to drive the load unit along an intended path of travel in use, the drive unit including a carriage moveable along said intended path of travel and a load unit engaging member on the carriage and moveable relative thereto between a load unit engagement position and an inoperative position, the drive arrangement further including an elongate, endless drive member extending along the intended path of travel of said load unit and coupled at its opposite ends respectively to said carriage so that the member and said carriage define a loop and the carriage is moved along said path by movement of said loop, said load unit engaging member being moveable between said load unit engagement position and said inoperative position by relative movement between the oppose ends of said drive member respectively.

2. A cargo handling system as claimed in claim 1 wherein said elongate drive member is an elongate belt or chain.

3. A cargo handling system as claimed in claim 1 wherein said coupling of at least one of the ends of said belt or chain to the carriage permits movement of said end relative to the carriage to provide said relative movement between the first and second elements of the arrangement to actuate said load unit engaging member.

4. A cargo handling system as claimed in claim 1 wherein said opposite ends of said drive belt or chain are moved relative to one another by increasing and decreasing the tension in the drive belt or chain.

5. A cargo handling system as claimed in claim 3 wherein said opposite ends of said drive belt or chain are moved relative to one another by increasing and decreasing the tension in the drive belt or chain.

6. A cargo handling system as claimed in claim 4 wherein the tension in the drive belt or chain is varied by an adjustable pulley arrangement co-operating with the drive belt or chain.

7. A cargo handling system as claimed in claim 5 wherein the tension in the drive belt or chain is varied by an adjustable pulley arrangement cooperating with the drive belt or chain.

* * * * *